US012671940B2

(12) United States Patent
Maziewski et al.

(10) Patent No.: US 12,671,940 B2
(45) Date of Patent: Jun. 30, 2026

(54) MICROPHONE CHANNEL SELF-NOISE SILENCING

(71) Applicant: Intel Corporation, Santa Clara, CA (US)

(72) Inventors: Przemyslaw Maziewski, Gdansk (PL); Adam Kupryjanow, Gdansk (PL); Lukasz Pindor, Pruszcz Gdański (PL); Sebastian Rosenkiewicz, Gdańsk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/147,777

(22) Filed: Dec. 29, 2022

(65) Prior Publication Data

US 2024/0223948 A1 Jul. 4, 2024

(51) Int. Cl.
*H04R 3/04* (2006.01)

(52) U.S. Cl.
CPC ........... *H04R 3/04* (2013.01); *H04R 2410/03* (2013.01)

(58) Field of Classification Search
CPC ...... H04S 3/004; G06V 10/255; G06V 20/64; H04R 2420/05; H04R 2420/07; H04R 1/1041; H04R 1/10; H04R 5/033; H04R 29/00; G06F 3/165
USPC .............. 381/91, 92, 122, 73.1, 98, 111–115
See application file for complete search history.

(56) References Cited

U.S. PATENT DOCUMENTS 7,409,068 B2 * 8/2008 Ryan .................... H04R 25/407 381/313
9,210,507 B2 * 12/2015 Hetherington ...... G10L 21/0208
10,657,983 B2 5/2020 Maziewski et al.
2021/0012767 A1 1/2021 Kupryjanow et al.
2021/0352406 A1 * 11/2021 Sharma ................... G10L 15/20
2022/0408201 A1 12/2022 Pindor et al.
2023/0410829 A1 * 12/2023 Cartwright .......... G10L 21/0232
2024/0331716 A1 * 10/2024 Bean ....................... G06F 1/163

OTHER PUBLICATIONS

"2021 MacBook Pro built-in microphone vs. studio microphone. Guess which is which! Incredible.," [Online]. Available: https://www.reddit.com/r/macbookpro/comments/qkp5k5/2021_macbook_pro_builtin_microphone_vs_studio/; Accessed Jan. 25, 2023; 4 pages.

(Continued)

*Primary Examiner* — Xu Mei
(74) *Attorney, Agent, or Firm* — Akona IP PC

(57) ABSTRACT

A user computing device includes a microphone to generate an audio signal and a self-noise silencer to generate a feature set corresponding to the audio signal, where the input feature identifies, for each of a plurality of frequency components in the audio signal, a respective magnitude value. At least a portion of the feature set is provided as an input to a machine learning model trained to infer frequencies contributing to self-noise generated at the microphone. An attenuation mask is generated, based on an output of the machine learning model, that identifies an attenuation value for at least a subset of the plurality of frequency components. The attenuation mask is applied to at least the subset of the magnitude values of the plurality of frequency components to remove self-noise from the audio signal and generate a denoised version of the audio signal.

20 Claims, 8 Drawing Sheets

(56) References Cited

OTHER PUBLICATIONS

"3QUEST: 3-fold Quality Evaluation of Speech in Telecommunications," Head Acoustics GmbH, Germany; 2008; 27 pages.
"Is the Macbook Microphone as good as a Shure microphone or other plug in microphones," [Online]. Available: https://www.quora.com/Is-the-Macbook-Microphone-as-good-as-a-Shure-microphone-or-other-plug-in-microphones; Accessed Jan. 25, 2023; 4 pages.
Y. Luo, C. Han and N. Mesgarani, "Group Communication with Context Codec for Lightweight Source Separation," arXiv:2012.07291v2, 2021; 10 pages.

* cited by examiner

400

MICROPHONE CHANNEL SELF-NOISE SILENCING

TECHNICAL FIELD

This disclosure relates in general to the field of computer systems and, more particularly, to noise reduction in a microphone of a user computing device.

BACKGROUND

Noise reduction is the process of removing noise from a signal. Noise may be any undesirable sound that is present in the signal. Noise reduction techniques are conceptually very similar regardless of the signal being processed, however a priori knowledge of the characteristics of an expected signal can mean the implementations of these techniques vary greatly depending on the type of signal. Recording devices, both analogue and digital, have traits which make them susceptible to noise. Noise can be random or white noise with no coherence, or coherent noise introduced by a mechanism of the device or processing algorithms. Algorithms for the reduction of background noise are used in many speech communication systems. Mobile phones and hearing aids have integrated single- or multi-channel algorithms to enhance the speech quality in adverse environments.

BRIEF DESCRIPTION OF THE DRAWINGS

Like reference numbers and designations in the various drawings indicate like elements.

DETAILED DESCRIPTION OF EXAMPLE EMBODIMENTS

In some implementations, an improved user computing device, such as laptop computers, desktop computers, smart phones, video game consoles, or smart televisions may be equipped with logic to detect and filter self-noise of a microphone subsystem (e.g., noise generated due to imperfections in the microphone, hardware implementing one or more stages of the audio pipeline (e.g., the microphone codec), or the user computing device). Such self-noise may natively degrade the quality of audio generated by the microphone subsystem of the user computing device.

As user computing systems are often mass marketed, the economic model dictates that the bill of materials to construct such systems and their constituent subsystems be constructed with relatively inexpensive hardware so as to allow the price point of the overall system to be assessable to the general populous. This often requires a tradeoff, as advanced, state of the art hardware (e.g., state of the art digital microphones or machine learning hardware) may guarantee the best or most desirable performance but may make the overall system prohibitively expensive within its category. For instance, while higher end, more expensive microphones may inherently generate less self-noise and enable higher signal-to-noise ratio (SNR) audio, including such high-end microphones or additional specialized hardware for eliminating self-noise of lower end microphones may each be non-starters within budgets of current user computing devices.

Figure 1:
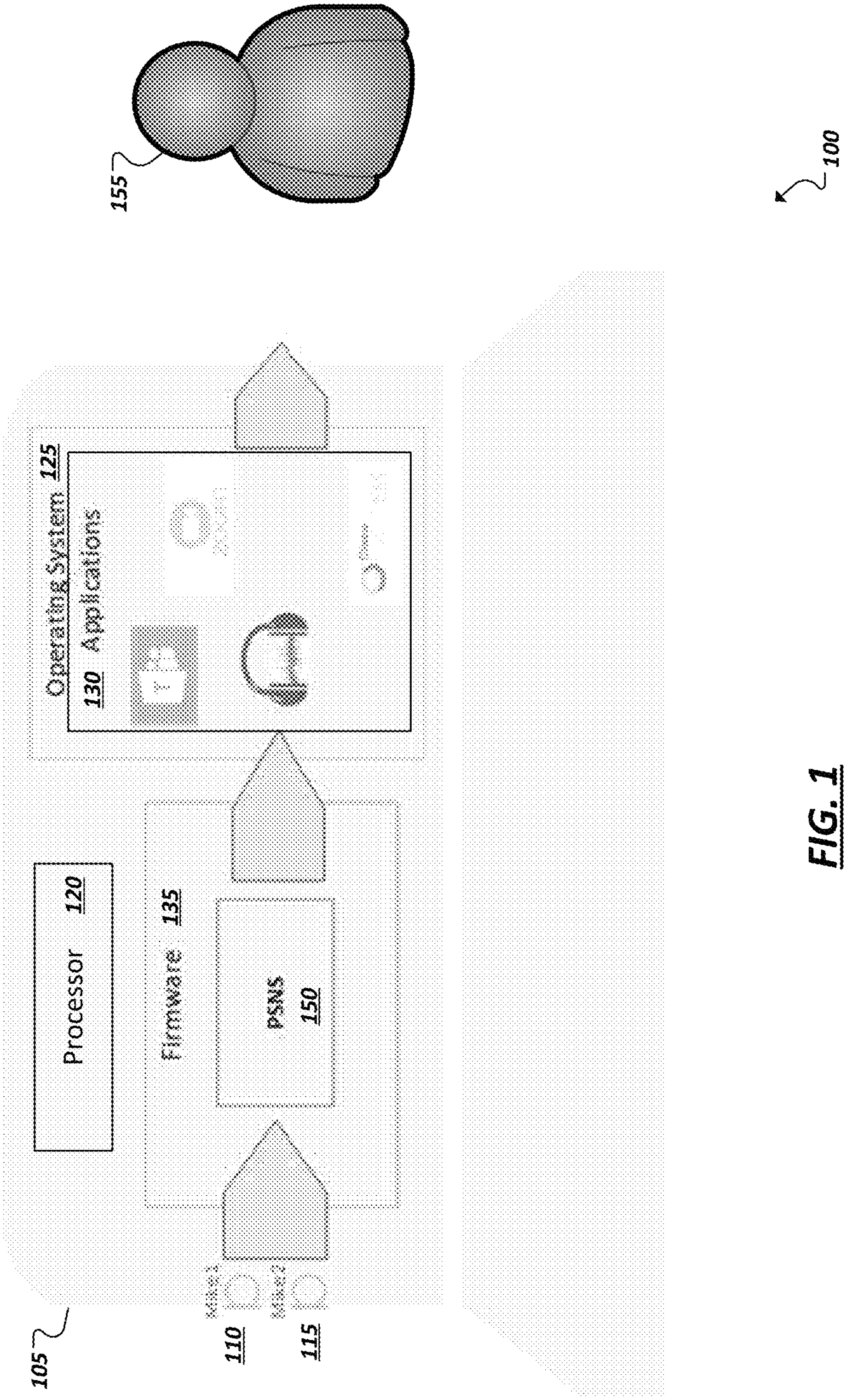
FIG. 1 is a simplified block diagram illustrating an example user computing device.

Turning to FIG. 1, a simplified block diagram 100 is shown illustrating an example user computing device 105 (e.g., a laptop computer) equipped with a pair of microphones 110, 115. The user computing device 105 may include a processor 120 and an operating system 125 executed using the processor 120. One or more applications (e.g., 130) may run within the operating system 125 and utilize audio data generated using one or more of the microphones 105, 110. Such applications 130 may include, for instance, speech recognition software, teleconference software, voice command software, video conferencing software, audio recording and/or editing software, speech-to-text software, among other examples. Firmware 135 may be provided to pre-process audio generated by the microphones 110, 115 (e.g., prior to the audio data being sent to the operating system and used by the applications). The firmware 135 may include a self-noise silencer 150 to strip self-noise generated by the microphones 110, 115 and/or audio pipeline hardware from the audio signal. In some implementations, the firmware 135 may additionally provide other signal conditioning and enhancements to prepare the audio signals for use by applications 130 run on the user computing device. Ultimately, such audio pre-processing may enable improved performance of the applications using the improved audio signals to deliver improved results to a user 155, among other example benefits.

In general, "user computing devices," "clients," "computing devices," "network elements," "hosts," "system-type system entities," "user devices," and "systems" (e.g., 105, etc.) in an example computing environment, can include hardware circuitry and other logic operable to receive, transmit, process, store, or manage data and information associated with the computing environment. As used in this document, the term "computer," "processor," "processor device," or "processing device" is intended to encompass any suitable processing apparatus. For example, elements shown as single devices within the computing environment may be implemented using a plurality of computing devices and processors, such as server pools including multiple server computers. Further, any, all, or some of the computing devices may be adapted to execute any operating system (e.g., 125), including Linux, UNIX, Microsoft Windows, Apple OS, Apple IOS, Google Android, Windows Server, etc., as well as virtual machines adapted to virtualize execution of a particular operating system, including customized and proprietary operating systems.

In some implementations, a user computing device 105 may be participate with other devices, such as wearable devices, Internet-of-Things devices, connected home devices (e.g., home health devices), and other devices in a machine-to-machine network, such as Internet-of-things (IOT) networking, a fog network, connect home network, or other network (e.g., using wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity).

Microphones are important components within user computing devices, such as laptop computers, desktop computers, smartphones, tablets, gaming systems, security system, in-vehicle computing systems, smart appliances, and other computing systems to be interfaced with and utilized by a human or animal user. Microphones may play a vital role in implementing many popular use cases and related applications, such as teleconferencing, recording music, collecting sound information (e.g., baby monitors, security monitoring systems, etc.). Indeed, the quality of the microphone(s) and audio information generated using the microphone may determine the final impression of the users and the usability or accuracy of the audio information generated. Microphones themselves, and hardware or other circuitry utilized in connection with the microphones to facilitate the generation of audio data may introduce coherent noise, or "self-noise", which may affect the quality of the audio information along with other noise and distortion, which may be present in the surrounding environment or the source of the sound. Reducing self-noise or nonlinear distortion of microphones may increase the perceived quality of sound.

The most straightforward approach to improving the quality of sound generated at a user computing device is to outfit the computing device with the highest quality microphone. However, better microphones cost more. As an example, the price difference of microphones with a difference of even 3 dB in SNR may be too costly for adoption in some user computing devices. Generally, in many mass-market user computing devices, the price point and resulting bill of materials budget for such devices may not allow for the inclusion of even marginally more expensive (and higher quality) microphones. Rather than utilizing a high-quality microphone, a user computing device may include firmware or other logic to improve sound data generated at the microphone, for instance, my reducing the noise and distortion inherent in a cheaper, lower quality microphone.

A variety of approaches may be applied to improve the quality of the microphone signal on a user computing device. For instance, the shape of the microphone channels should be properly designed, and electronic elements should be carefully selected so that the capture path does not generate resonances or hums. This approach is costly. Another approach, often utilized cheap solutions, are microphones operating in tandem with a noise gate. A noise gate is a simple algorithm that mutes the output signal in the microphone channel if its input amplitude drops below a certain threshold. Noise gates, however, are a relatively blunt solution resulting in an effect that is noticeable to the users. For instance, if self-noise is present, well the noise gate is applied (e.g., when a user is not speaking), the self-noise, indeed all noise, is silenced, but when the noise gate is released (e.g., when the user resumes speaking) the intended audio is presented, but with the self-noise as well. Higher-powered or more specialized processing platforms may replace noise gating with more sophisticated algorithms, such as a dynamic noise suppressor (DNS) algorithm, such as a DNS algorithm based on a neural network. Such an algorithm, however, may requires considerable computing power or a large memory footprint, resources which may not be present or feasible (e.g., from a budget perspective or form factor perspective) in a user computing device intended for the mass market, among other example issues.

In one example implementation, firmware or other logic within a user computing device may be enhanced to implement a platform self-noise silencer specific to laptop microphones. For instance, the self-noise silencer may utilize a lightweight machine learning model (e.g., minimized in terms of size and processing latency) that may be implemented using processing and memory resources typical of a mass-market user computing device. The machine learning model, in one implementation, may be a neural network (NN) model trained using selected acoustic material depicting the distortions introduced by microphone channels in a similar user computing device. While alternative implementations may be developed to utilize more complex machine learning models (e.g., with higher numbers of layers, parameters, and dimensions), such alternative models may be too heavy to be efficiently or effectively run on the limited resources of a user computing device. Moreover, such specialized hardware (whether in the form of a high-end microphone, specialized processing architectures, expansive memory resources, etc.) may be prohibitively expensive for the budget constraints of current mass-market user computing devices. Indeed, a lightweight self-noise silencer may be utilized with inexpensive microphones and may be implemented at the firmware level without adding any additional hardware costs to the user computing device, while providing improved signal-to-noise ratio (SNR) characteristics with less disruption than noise gates or other existing techniques. A firmware implementation of a self-noise silencer may also enable the solution to be independent of the operating system of the user computing device, allowing for widespread deployment across a variety of different user computing device platforms. Further, an example self-noise silencer may provide a low latency solution, such that the latency introduced through the addition of the self-noise silencer is not noticeable to the user, among other example advantages.

In one example implementation, a user computing device may include one or multiple microphones. The digital signal generated from a microphone is processed by firmware code (FW) executed on the user computing device (e.g., in the Platform Controller Hub (PCH)). In some instances, the signal, following processing at the firmware, may be delivered to the operating system (OS) of the user computing device (e.g., via audio drivers). For instance, there may be different driver packages for different operating systems (e.g., of various different user computing devices). However, firmware code may be similar (and redeployed) in multiple different OSes. Additionally, applications (e.g., client applications) running on the user computing device's OS can retrieve the processed microphone signal via the appropriate OS interface. The application may use this signal in association with the logic of the application, such as playing the processed audio on headphones, streaming the processed over a voice call (e.g., conference call) or other communication, perform analysis or classification of the content of the processed audio (e.g., automatic speech or key phrase recognition), among a myriad of other example applications and associated functionality.

Figure 2:
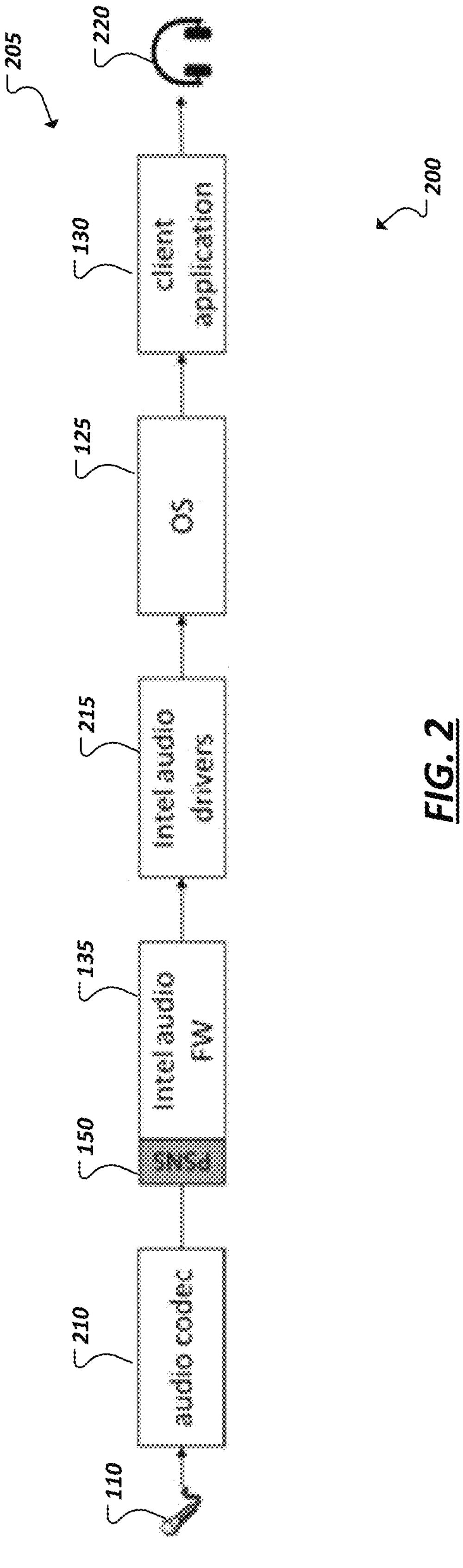
FIG. 2 is a simplified block diagram of an example audio pipeline of a user computing device.

For instance, FIG. 2 is a simplified block diagram 200 illustrating an example signal path 205 from a microphone 110 to a client application 130. An example, lightweight self-noise silencer block 150 may be provided within the signal path 205 to improve the quality (e.g., SNR) of audio signals generated by the microphones 110, for instance, to improve the results ultimately generated by the application 130. In one example, such as illustrated in FIG. 2, the self-noise silencer block 150 may be implemented as a first block within audio firmware 135 of the user computing device. In such an implementation, the improvement in signal quality introduced by self-noise silencer 150 may be enjoyed by any client application (e.g., 130) regardless of the specific OS utilized by the user computing device. Accordingly, user computing devices incorporating such firmware may exhibit enhanced audio quality, even without the provision of expensive higher performing microphones or specialty hardware for implementing heavy or complex machine learning or audio processing functionality, among other examples.

In the example of FIG. 2, an example signal path of a user computing device may begin with audio codec circuitry 210 receiving a signal generated by a microphone 110 of the user computing device. A digital version of the microphone signal may be provided from the audio codec block 210 to audio firmware 135. A self-noise silencer 150, implemented, for instance, using a neural network trained to recognize self-noise of a microphone, the audio codec, and/or other components of the user computing device, may filter self-noise from the digital microphone signal. Additional processing may be performed on the signal by the audio firmware 135, before passing the improved signal to one or more audio drivers 215 of the user computing device. The audio drivers 215 may interface with the operating system 125, which may provide the improved signal for use by one or more of the applications 130 of the user computing device. One or more of the applications may generate audio for presentation (at 220) to a user based on the processed microphone signal. For instance, the audio may be presented at the speakers of the same user computing devices where audio was recorded by the microphone(s) 110 or at a remote user computing device (e.g., after being transmitted from the one user computing device to the other over a network (e.g., in a teleconference application)), among other example applications and implementations.

Figure 3:
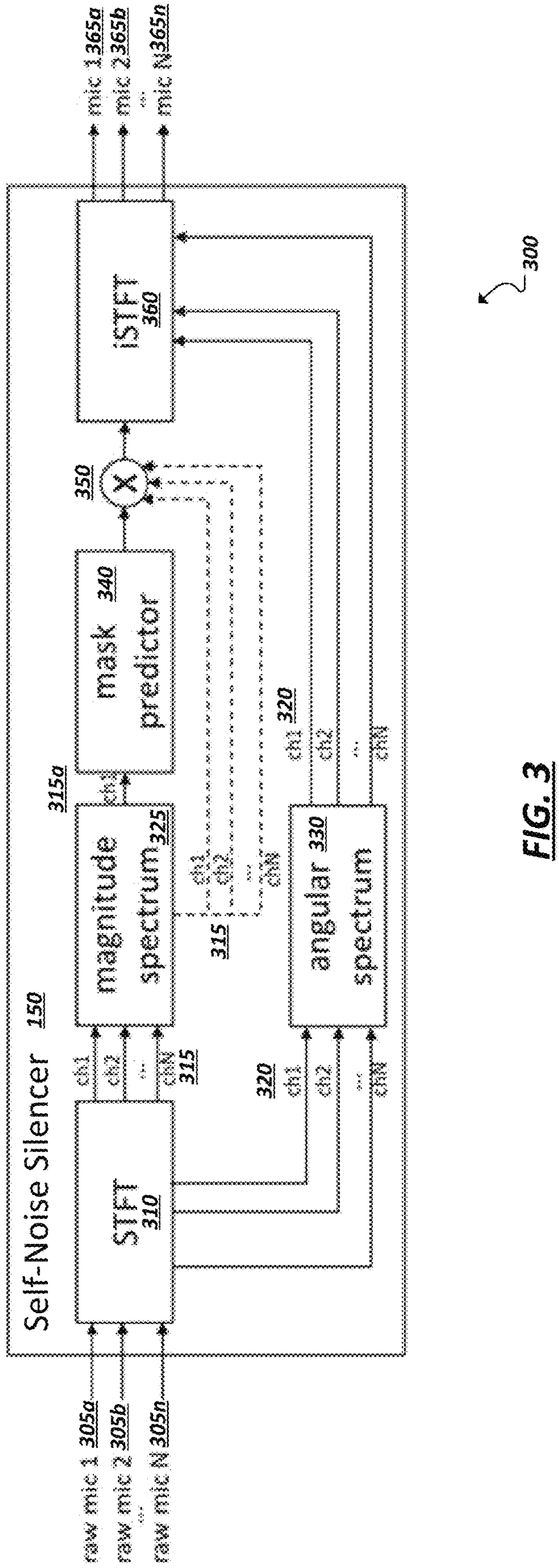
FIG. 3 is a simplified block diagram illustrating an example self-noise silencer block.

Turning FIG. 3 is a block diagram 300 illustrating an example implementation of a self-noise silencer 150. The self-noise silencer block 150 may handle one or more inputs 305*a-n* from one or many microphones and return the same number of outputs 365*a-n* (corresponding to the number of microphones of the user computing device). A microphone signal input to the self-noise silencer 150 and processed by the feature extractor (e.g., 310) may yield a resulting complex multi-channel spectrum from which the multi-channel amplitude and angular spectrum may be calculated and identified. The feature extractor sub-block 310, in one example, may be included and implemented using a short-time Fourier transform (STFT). In other examples, an auto encoder or other alternative logic may be utilized for the feature extractor. In this example, STFT block 310 may divide each signal provided (at 305*a-n*) from one of the microphones into its magnitude 315 and phase (or angular) 320 components for each frequency in a plurality of respective frequency components of each of the signals 305*a-n*. The collective magnitude components of the signal channels may embody a magnitude spectrum 325 captured by the microphones within a range, or frame, of time. Likewise, collective angular components can embody an angular spectrum 330 for the frame.

A self-noise silencer 150 may include a mask predictor block 340 that includes a trained machine learning model to determine or infer, from the magnitude components of one of the signals, the frequencies contributing to the self-noise generated by the microphone and/or other sub-systems of the user computing device (e.g., the audio codec hardware, a fan of the user computing device, static environment noise, etc.). In one example, mask predictor sub-block 340 may utilize a neural network-based model to determine (or predict) a mask to attenuate the amplitude of certain frequencies within the spectrum based on those frequencies representing self-noise. Accordingly, as an output, the mask predictor block 340 may generate a magnitude attenuation mask that defines an attenuation value for each one of the frequency components of the signal based on the inference of certain frequency components' contributions to self-noise. For instance, for each frequency component, the attenuation mask may define a value between (and including) 0 and 1, where a 0 indicates that the frequency components should be filtered out completely and a 1 indicates that the frequency component should pass through unattenuated. Some mask values may be between 0 and 1 to partially attenuate a frequency component based on the inference that the corresponding frequency component contributes to self-noise. For instance, a particular one of the frequency components of a selected signal (used for the input to the machine learning model (e.g., neural network)) of the mask predictor block 340 may be assigned a magnitude attenuation value in the attenuation mask of 0.25 (e.g., meaning that the magnitude of the particular frequency component should be reduced by 75%).

With the attenuation mask generated for the frame, the attenuation mask may be applied to (e.g., multiplied against) 350 each signal's portion of the magnitude spectrum to cause each frequency component's magnitude to be attenuated in accordance with a corresponding value in the attenuation mask. In some implementations, each of the signal's magnitude spectrum may be provided as inputs to a mask predictor 340 and a separate attenuation mask generated for each signal. That signal-specific attenuation mask may then be applied to its corresponding signal.

In the example illustrated in FIG. 3, the magnitudes of a single one of the signals (e.g., 315*a*) is selected as the input to the mask predictor 340 to generate a single attenuation mask that is to be applied to each of the magnitudes of each of the signals 305*a-n*. Using a single representative signal (rather than multiple signals) may leverage an assumption that, because multiple microphones on the same user computing device are positioned in relatively close proximity (within the dimensions of the user computing device's form factor), factors contributing to the self-noise experienced at one of the microphones is likely to also be experienced at each of the other microphones and/or that self-noise frequencies are likely to be common in the self-noise manifest at each microphone mounted on a single user computing device. As such, the attenuation mask generated from a single representative signal may be effectively applied to or superimposed on all of the signals' magnitude spectrum (e.g., through multiplication in the spectral domain). By using an attenuation mask generated based on a single channel to all output channels, significant computational savings may be achieved for user computing devices with more than one microphone. In some implementations, a representative signal used by the mask predictor may be statically determined, such that it is used to determine an attenuation mask for each frame. For instance, the microphone responsible for generating this representative signal may have the best SNR or other attributes. In other examples, the representative signal may be dynamically selected for each frame, with the microphone used to generate the representative signal used by the mask predictor 340 changing between at least some of the frames, among other example implementations.

After an attenuation mask has been applied to generate attenuated versions of the magnitude portion of each signal 315, filtered versions of the audio signals (e.g., 305*a-n*) generated by the user computing device microphone(s) may be generated by recombining the (now attenuated) magnitude components with the original angular components 320 using an inverse transformation block 360, in this case, an inverse STFT (ISTFT) block 360. The resulting reconstructed and filtered audio signals 365*a-n* may have all or a considerable portion of the self-noise removed, resulting in cleaner audio comparable to that generated using higher-end or more expensive microphones. The self-noise silencers 150 may achieve this result using firmware executed using the existing, standard processing hardware (and operating system) of the user computing device and do so while meeting constraints of firmware memory limitations and with acceptably low latency that the latency introduced through self-noise filtering is effectively imperceptible to human users. For instance, in examples utilizing STFT, the self-noise silencer block 150 may be configured to utilize frame size and frame offset in the STFT block (e.g., 310) to achieve the desired signal quality and latency. For instance, in an illustrative example, the STFT may be calculated (e.g., by sub-block 310) for a 16 ms frame size and a 4 ms frame offset. In some implementations, to further decrease latency, instead of using overlap-add (OLA) for the STFT, overlap-save (OSA) may be used. In such instances, the use of OSA allows the overall self-noise silencer latency to be reduced (e.g., from 16 ms to 4 ms). Latency of the self-noise silencer 150 can be further reduced at the expense of increased processing power (e.g., shorter frame offsets) or reduced signal quality (e.g., shorter frame size), among other examples.

Firmware may make use of a standard or general-purpose chipset to improve the quality of a microphone signal without the need of additional specialized hardware. Processing in a defined chipset in practice, however, may mean that a firmware-based algorithm is limited by certain chipset-defined limitations. A firmware-based implementation of a self-noise silencer may be both small and fast. In one limited, specific example, memory occupied by the algorithm may not be allowed to exceed 300 kB with a computational load not to exceed 100 MFlops and processing latency less than 8 ms (among other example requirements). In some implementations, a co-processor, machine learning accelerator, or other processing hardware natively present on a user computing device may be leveraged to implement aspects of the self-noise silencer. Generally, a lightweight implementation of a self-noise silencer may aim to keep memory usage, computational load, and latency as low as possible. The machine learning model utilized in the mask predictor may be selected, for instance, based on an attempt to optimize the combination of memory usage, computational load, and latency to keep each as low as is practicable (based on the architectural limitations of the user computing device), among other example implementation principles.

As one example of a lightweight machine learning model for use in a firmware-based self-noise silencer, a neural network model may be utilized. Traditional source separation algorithms utilize deep neural networks, which contain stacked recurrent layers (e.g., LSTM layers) with a relatively large number of hidden layers. Such models are quite complex and large (e.g., with over tens of millions of parameters) and not feasible for execution in some user computing devices or in firmware. An example lightweight neural network may reduce the size of the model as well as the computational load for processing the model by splitting a high-dimensional feature, such as a spectrum of an audio signal, into groups of lower-dimensional features, such as sub-band spectra. Similar separation may be applied across all the groups for weight sharing. An inter-group module may be applied to capture the dependencies within the groups, so that the processing of each group depends on the available global information. Compared to other conventional models (e.g., LSTM models) that explicitly model time and frequency dependencies and concatenates the sub-band features back to the full-band feature, some implementations of a lightweight neural network may omit such concatenation and instead apply a small module to communicate across the groups. Further, by converting the high-dimensional feature into low-dimensional features allows for a smaller network module (e.g., a convolutional neural network (CNN) layer, a recurrent neural network (RNN) layer, etc.) to be used that is significantly smaller than what would be used to process the original high-dimensional feature. Such aspects along with corresponding weight sharing allows the over size of the neural network to be significantly reduced compared to conventional models designed to process the original high-dimensional features.

Figure 4:
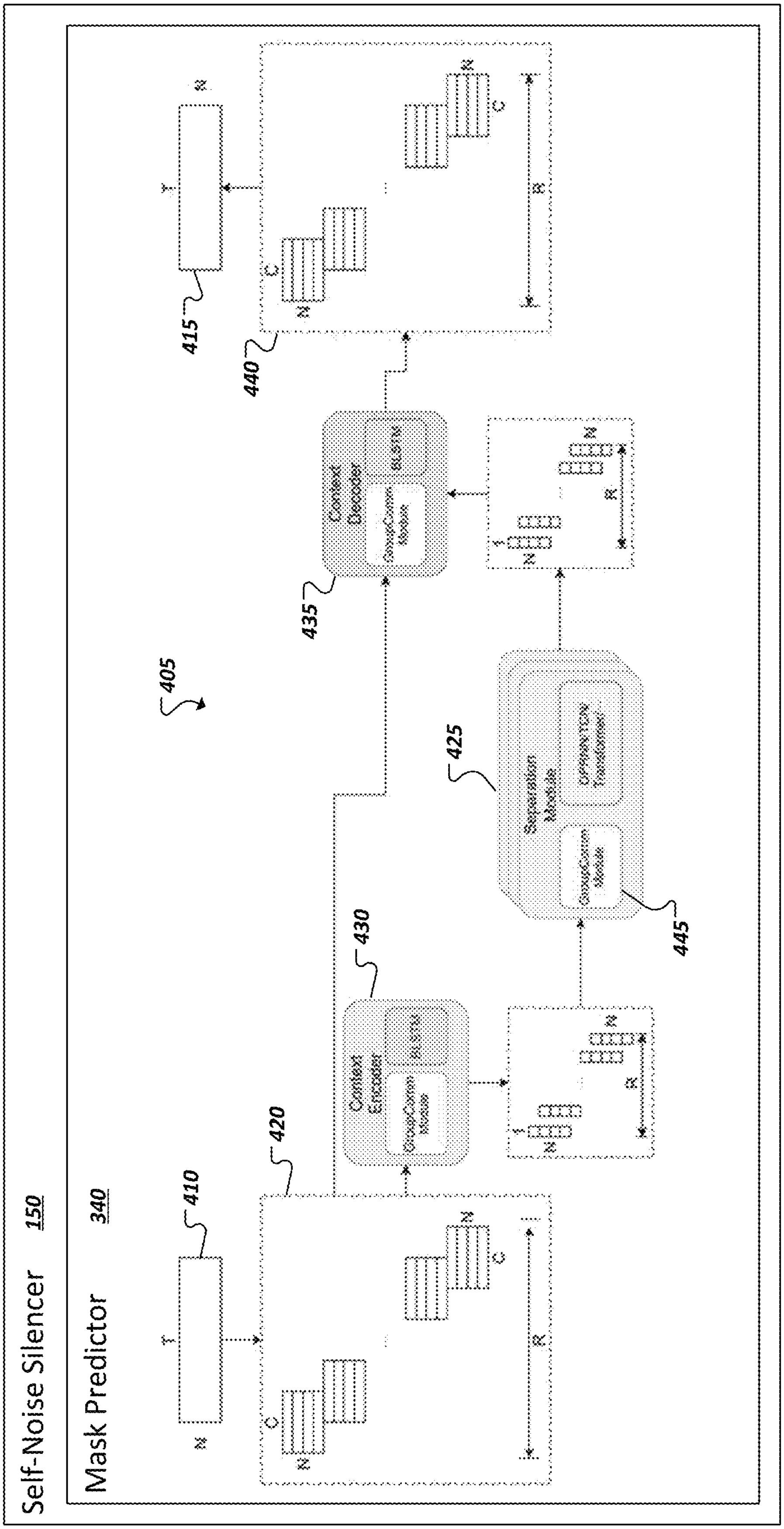
FIG. 4 is a simplified block diagram illustrating an example self-noise silencer block utilizing an example light-weight neural network model.

In some implementations, the neural network architecture utilized in a self-noise silencer to generate masks for the amplitude spectrum of a signal may adopt a framework which splits high-dimensional features into lower-dimensional features, such as the GroupComm 3 (GC3) framework, UBlock, DPRNN, TCN, or another network architecture utilizing lower dimensional features. FIG. 4 is a simplified block diagram 400 illustrating a representation of an example of such a topology, such as a UBlock-based topology, integrated within the mask predictor 340 of an example self-noise silencer. In one example, a feature extractor block (e.g., a STFT block) may transform an audio signal of a microphone into an input feature set 410 (e.g., a tensor) to be input to a machine learning model 405 trained to recognize frequency components of the signal that contribute to self-noise present within an audio signal. In this example, the neural network model 405 is provided with feature inputs 410 characterized by the amplitude spectrum calculated from audio signals according to a particular sampling rate (e.g., 16 kHz). The neural network model may produce a spectral mask 415 per signal frame as an output responsive to the feature input 410. The spectral (attenuation) mask 415 may then be multiplied by the spectrum of the input signal (e.g., 410). In one example implementation, the neural network model (e.g., 405) may use a relatively small set (e.g., 20,000) of trainable parameters and with modest compute (e.g., 47 MFlops), among other example implementations.

Continuing with the example of FIG. 4, in some implementations, a lightweight neural network 405 for use by a mask predictor block 340 may split the high-dimensional magnitude spectrum identified in the feature input 410 into low-dimensional features (at 420). In addition to source separation modules (e.g., 425) trained to separate self-noise from useful noise, the model 405 may additionally include modules for context encoding (e.g., 430) and decoding (e.g., 435). While splitting high-dimensional features into low-dimensional features, such as in GroupComm-based models (e.g., 405) can drastically decrease the overall model size, the resulting model complexity may still be relatively high. Further, memory footprints used in such models, particular where group sizes are small, may be high due to the additional computation introduced by the GroupComm modules (e.g., 445). In order to further decrease the number of multiply-accumulate (MAC) operations, while still maintaining performance, a context encoding/decoding framework may be introduced to enhance the GroupComm-based model. Such encoding can also serve to accelerate training of the model and reduce memory consumption in both training and inference time. In one example, the model 405 may include a context encoder 430 and a context decoder 435. The context encoder 430 may function to summarize the temporal context of local features into a single feature representing the global characteristics of the context, with the context decoder 435 transforming the compressed feature back to the context features. Ultimately, converting the input contexts into higher-level representations implements a nonlinear downsampling step that generates context-level embeddings and significantly decreases the length of a feature sequence. In this example, rather than performing iterative downsampling and upsampling, the context encoding is performed only once, with the remaining modules (e.g., 425) applied on the downsampled features, which enables a smaller memory footprint and faster training speed. Such an architecture may be implemented, for instance, in GroupComm and Context Codec (GC3) network topologies, for instance. After decoding the context (e.g., at 435) the output may be converted back (e.g., at 440) into the original high-dimensional features, for instance, as a high-dimensional attenuation mask (e.g., 415).

It should be appreciated that the example neural network 405 illustrated and described in FIG. 4 is but one of potentially many different alternative machine learning models that may be adopted in a mask predictor 340 of a self-noise silencer block 150. Indeed, alternative network topologies and model types may be employed to detect the frequency components of an audio signal contributing to self-noise within the audio signal. Such machine learning models may be selected, for instance, based on the specific capabilities and limitations of the user computing device on which the self-noise silencer is to be implemented, such as the processing capabilities, available memory, firmware requirements, and other example considerations.

Figure 5:
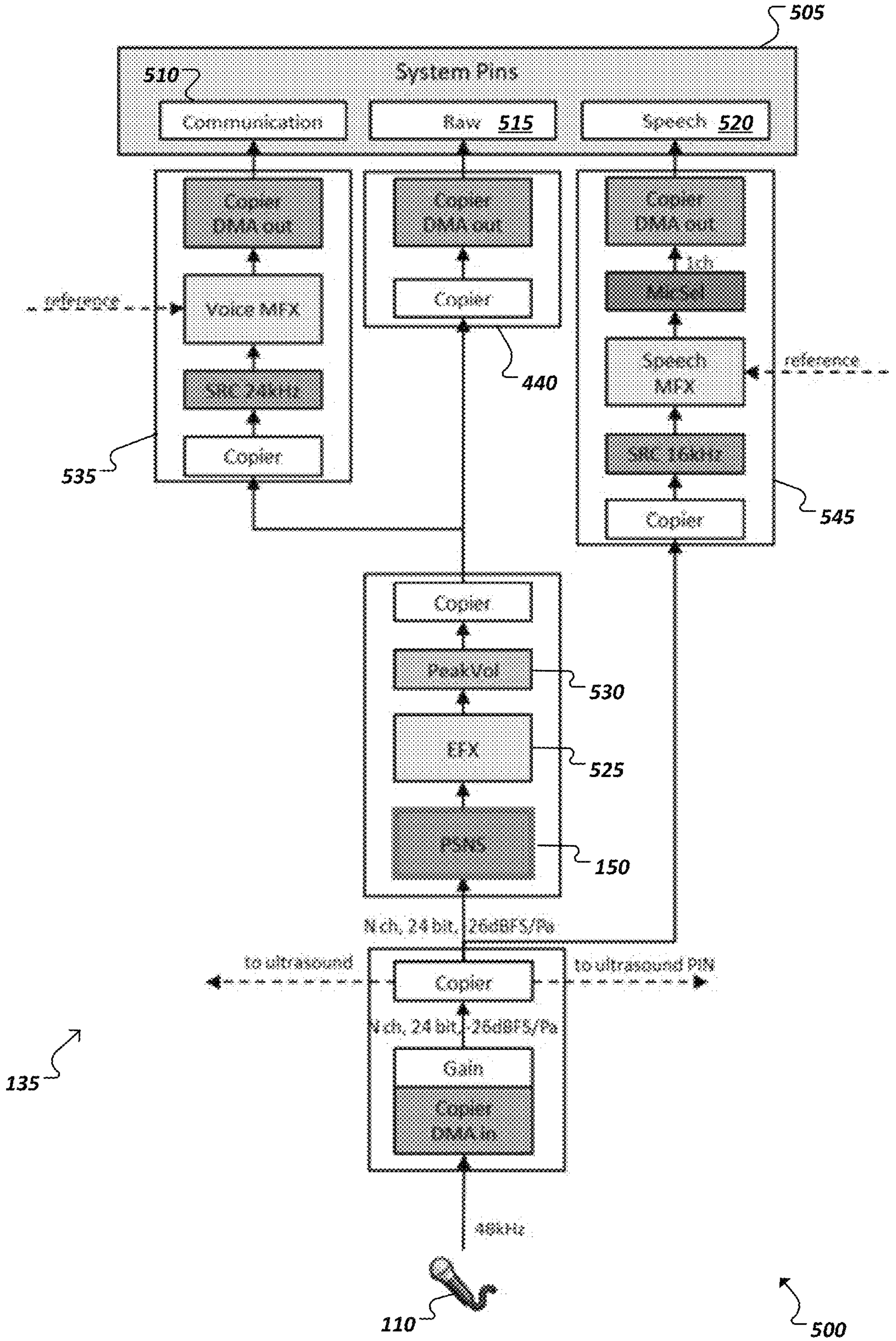
FIG. 5 is a simplified block diagram illustrating example firmware of a user computing device including a self-noise silencer.

In one example, a self-noise silencer block, such as described in the example above, is implemented as a portion of audio firmware of a user computing device. Turning to FIG. 5, a simplified block diagram 500 illustrates an example implementation of such improved audio firmware 135. For instance, FIG. 5 illustrates an example audio stack for a WINDOWS™-based operating system. An audio signal generated at a microphone 110 may be processed by one or more components (e.g., hardware, firmware, drivers, etc.) in the stack before being fed to the operating system using defined system pins 505. In one example, multiple system pins may be defined, including a communication pin 510 (e.g., for voice calls, a raw audio pin 515 (e.g., audio that is unprocessed following the firmware 135), and a speech pin 520 (e.g., for human to computer commands). In one example, it may be desired that, from the end-user perspective, the proposed denoising effects should be audible in all audio streams, the self-noise silencer 150 may be located near the beginning of the audio stack.

In some implementations, audio firmware 135 of a user computing device may include logical blocks to implement multiple different algorithms used to process audio signals generated by the microphone 110. For instance, in addition to a self-noise silencer 150, firmware may include an end point (without whitespace) effects (EFX) block 525 and peak volume processing block 530, among other examples. In one implementation, the self-noise silencer block 150 may be located just before the EFX block 525, for instance, to ensure that every signal captured by the laptop's microphones and exposed to human user will be processed by self-noise silencer 150. Audio firmware 135 may deliver processed audio signals (including self-noise removal) to one or more other processing blocks 535, 540 (e.g., also implemented in audio firmware), which implement alternative parallel audio processing paths. For instance, denoised audio signals may be delivered to processing blocks 535, 540 to be provided to the user computing device operating system via a communication pin 510 and raw data pin 515 respectively. Other processing paths may depend on processing microphone audio signals in their original, unmodified state. For instance, a speech pin 520 may be used to receive audio data inputs (e.g., from processing blocks 545) for use in speech recognition tasks performed by applications running on the operating system (e.g., digital personal assistant, speech-to-text, etc.), and some of these tasks may depend on machine learning models trained on unprocessed audio signals (e.g., which include self-noise characteristic of the microphone 110) to function properly, among other examples.

As noted above, in some implementations, a mask predictor of a self-noise silencer may be built upon a neural network model to determine the frequency components that should be attenuated to negate self-noise on the platform. In one example implementation, the mask predictor may be implemented as a lightweight neural network configured to achieve a target signal quality while meeting a certain memory size and computing budget. While DNS neural networks may also be utilized for source separation within an audio signal, the size and computing requirements of DNS models are often prohibitive for inclusion with mass-market user computing devices. Table 1 includes a summary comparison of an example DNS algorithm and a self-noise silencer. For instance, a self-noise silencer may utilize a neural network (e.g., in its mask predictor) that is exponentially smaller than a DNS network. Further, inferences performed using the self-noise silencer's neural network may be completed with comparatively little computing power.

TABLE 1

Comparison of DNS and Self-Noise Silencer (SNS)

| Parameter | DNS | SNS |
|---|---|---|
| model size [kB] | 500-2000 | 40-150 |
| compute complexity [MFlops] | 250-2500 | 5-80 |
| network targets | speech | all signals other than platform self-noise (speech, music, baby cry, etc.) |
| supported noises | high level and non-stationary (baby cry, dog bark etc.) | low-level stationary (wideband noise, narrow band noise, hum noise, nonlinear distortions etc.) |
| target SNR improvement | unlimited | limited (e.g., to 9 dB) |

The self-noise silencer block (e.g., the neural network of the self-noise silencer's mask predictor) is trained to reduce noise and distortion of the microphone channel by removing self-noise of the microphone and user computing device but should not distort the useful signals by over-filtering the signal. Accordingly, a mask predictor may be trained to reliably identify all useful signals such as speech, music, or baby's crying (or other acoustic events other than noise), as well as the self-noise components of the signal. Accordingly, denoising by the self-noise silencer may be tuned, through training, so as to conservatively denoise microphone signals on the user computing device. For instance, in some implementations, conservatively training the mask predictor to avoid attenuating useful signals may result in limiting the target SNR gains in the processed microphone signal to a certain threshold value (e.g., 9 dB) during training of the mask predictor's neural network. In some implementations, training of a mask predictor's machine learning model may be tuned to a specific microphone model or user computing device model. In other implementations, the mask predictor may be more generally trained, for instance, to a class of microphones or user computing devices, such that the instances of the same self-noise silencer block may be effectively deployed on a range of different microphone or user computing device models (e.g., with the class), among other examples.

Training of a self-noise silencer's neural network can utilize a corpus of audio samples of selected "clean" signals, representing audio without the presence of self-noise. The corpus of training data may also include samples of stationary noise representative of signals that only include self-noise or other stationary noise. Table 2 summarizes an example corpus of training data that may be used to train the neural network of an example mask predictor of a self-noise silencer. In this example, to further improve the diversity of the training data set, clear speech and microphone noise samples may be mixed on the fly in random proportions during training.

In some implementations, clean signal samples may be focused on speech, as speech signals are often difficult to denoise. Other sounds may also be embodied in the clean signal samples (e.g., other sounds that are expected to be received at a microphone of a user computing device). Training may be measured, in some implementations, using automated speech quality meters (e.g., MOS scales) to assess the quality of signals denoised by the self-noise silencer, among other examples.

TABLE 2

Example Training Data Corpus

| Dataset Type | Dataset Content | Augmentation Parameters |
|---|---|---|
| Clean Signals | ~440 hours of clean speech | SNR range: +9 . . . +60 dB<br>Mixture signal level: −35 . . . 0 dB |
| Stationary Noises | ~4 hours of laptops self-noise | Speed change: 20% of signals in −15 . . . +15% range<br>Randomly generated additive noise: 40% of signals in −40 . . . −20 dB amplitude range |

Table 3 illustrates the example effect of applying an example self-noise silencer to an audio signal generated from audio recorded by an example microphone of a user computing device. Generally, a microphone's audio signal improves through processing by a self-noise silencer by removing self-noise components to increase the microphone's effective signal differential-to-noise ratio (SDNR) and SNR:

TABLE 3

Example Results of Self-Noise Silencing

| Metric Name | Unprocessed signal | Processed signal with SNS model | Absolute difference |
|---|---|---|---|
| Microphones Average SDNR [dB] (higher is better) | 46.83 | 51.23 | 4.4 |
| Microphones Average SNR [dB] (higher is better) | 66.13 | 74.67 | 8.54 |

Figure 6:
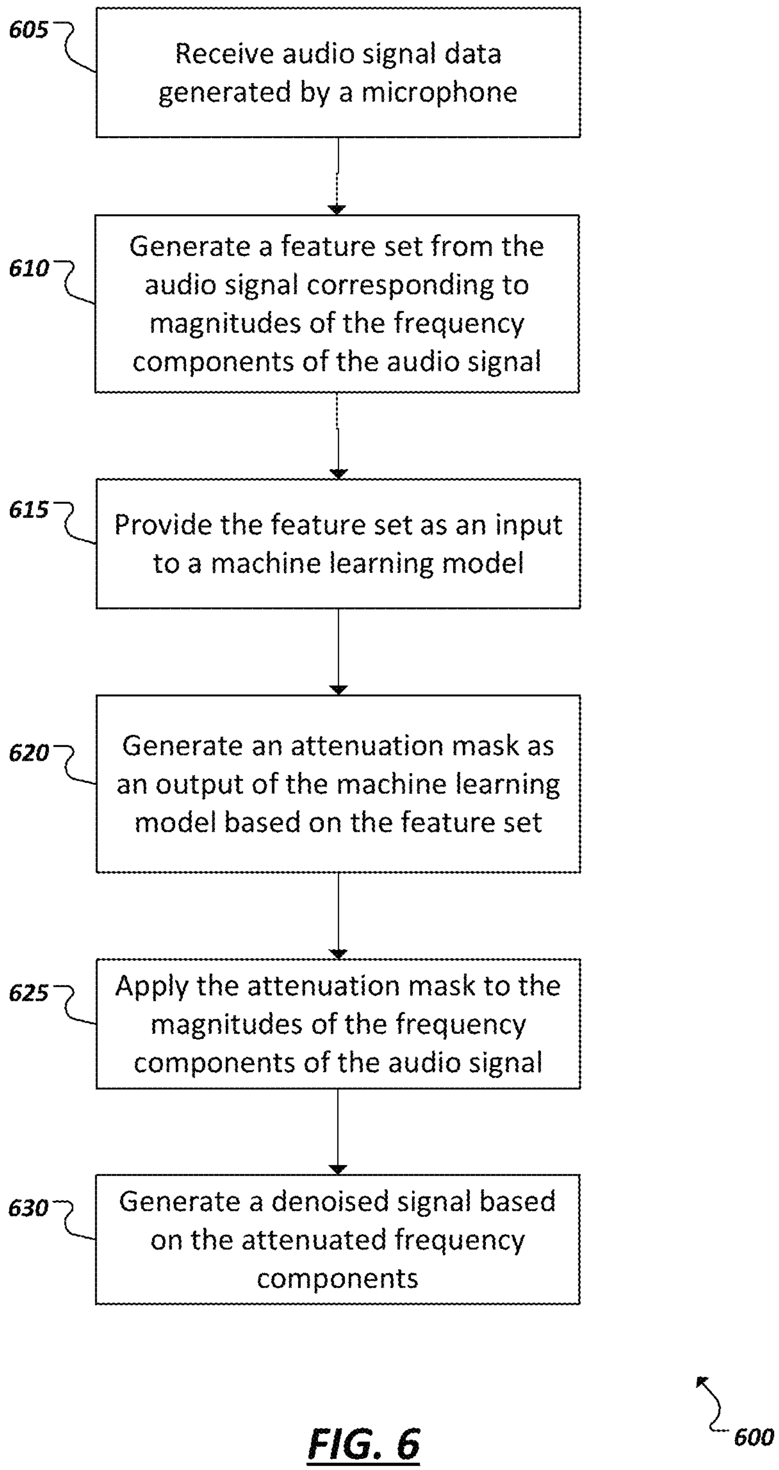
FIG. 6 is a simplified flow diagram illustrating example techniques for filtering self-noise from a microphone of a user computing device.

FIG. 6 is a simplified flowchart 600 illustrating an example technique for filter self-noise from an audio signal generated by a relatively lower quality microphone of a user computing device using a self-noise silencer, such as implement in audio firmware of the user computing device. In one example, a microphone of a user computing device (e.g., a laptop, desktop, smartphone, tablet, gaming system, smart appliance, security system, baby monitor, etc.) captures sound and converts the sound into an audio signal. In cases where the microphone is a digital microphone, the signal is a digital audio signal output by the microphone. In cases of an analog microphone, the audio signal may be converted to a digital audio signal by other logic (in firmware or hardware). The audio signal data is received 605 by the self-noise silencer. The audio signal data is processed to generate a feature set 610 from a range or frame of the audio signal, where the feature set includes the amplitude or magnitude spectrum of the audio signal, or the respective magnitudes of each of the sampled component frequencies of the audio signal with the frame. In one example, a Fourier transform (e.g., STFT) may be used to generate the feature set by separating the magnitude spectrum from the angular spectrum of the audio signal. In some implementations, a user computing device may include multiple microphones and multiple corresponding audio signals, or channels, may be generated with the frame. In such instances, the feature set may embody the respective magnitude spectrum of each of the channels.

The self-noise silencer, upon generating the feature set 610 may input the feature set 615 into its machine learning model trained to identify frequency components in the audio signal(s) that contribute the manifestation of self-noise as stationary noise generated by the microphone or other elements of the user computing device. In some cases, each channel's magnitude spectrum may be input to the machine learning model to generate 620 a respective attenuation mask for each channel in the frame. In other implementations, a single one of the channels' magnitude spectrum may be input to the machine learning model (e.g., selected statically or dynamically based on the quality of the channel (e.g., its SNR or SDNR)) to generate 620 a single attenuation mask to be applied to all of the channels for that frame. The attenuation mask is applied 625 to each of the frequency components to attenuate (wholly or partially) those frequency components identified as contributing to the self-noise. In some implementations, the attenuation mask is embodied as a matrix or other tensor that identifies, for each frequency component, an attenuation value between (and inclusive of) 0 and 1 and the attenuation mask is applied to a channel by multiplying the magnitude values of each frequency component against the corresponding attenuation value in the generated attenuation mask for a given frame. Subsequent attenuation masks may be generated for each successive frame. In some instances, frames may overlap in time, with attenuation masks generated to cover each overlapping frame, among other example implementations.

The attenuation mask is applied 625 to the magnitude spectrum (e.g., the corresponding feature set(s)) to generate an attenuated or denoised version of the magnitude spectrum. These attenuated magnitude values may be applied to generate 630 a corresponding attenuated or denoised version of the audio signal for a corresponding frame. In some implementations, generation 630 of the denoised signal may involved recombining the denoised magnitude spectrum with the original angular, or phase, spectrum, for instance, using an inverse Fourier transform (e.g., ISTFT). This denoised signal may be output by the self-noise silencer for additional processing by other audio firmware modules, drivers, or pre-processing hardware of the user computing device. The denoised signal may be ultimately provided to the operating system or other logic of the user computing device for use by one or more applications, which may benefit from the denoised signal to provide improved results and functionality to the end user of the user computing device, among other example uses and benefits.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 7:
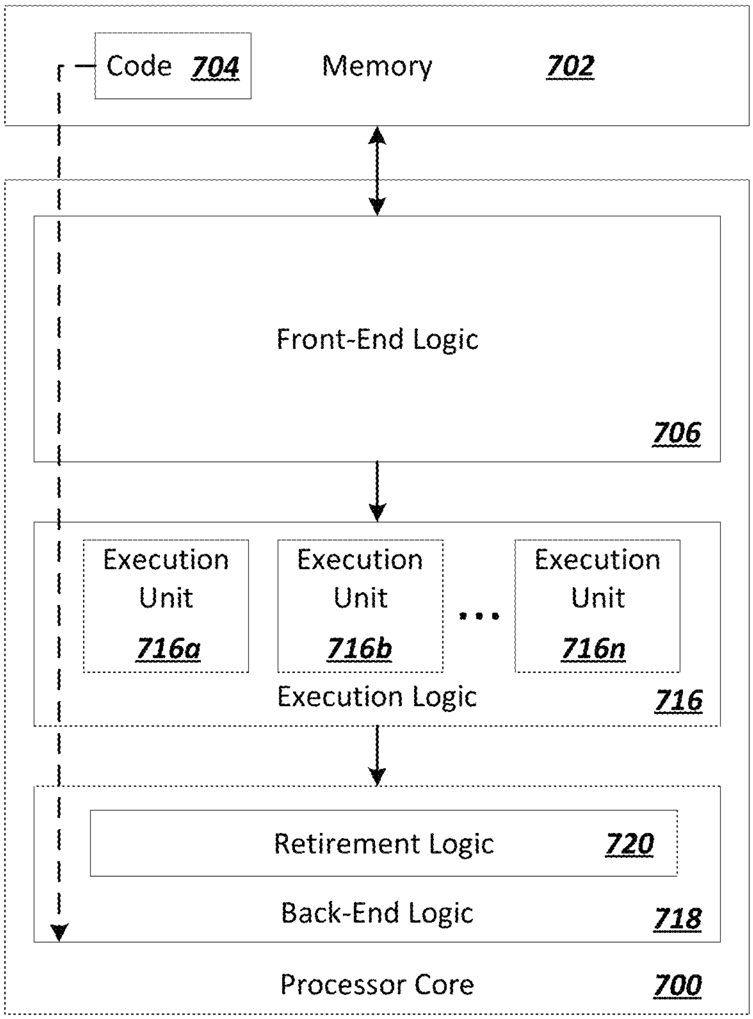
FIG. 7 is a simplified block diagram of an example processor of a computing device.
Figure 8:
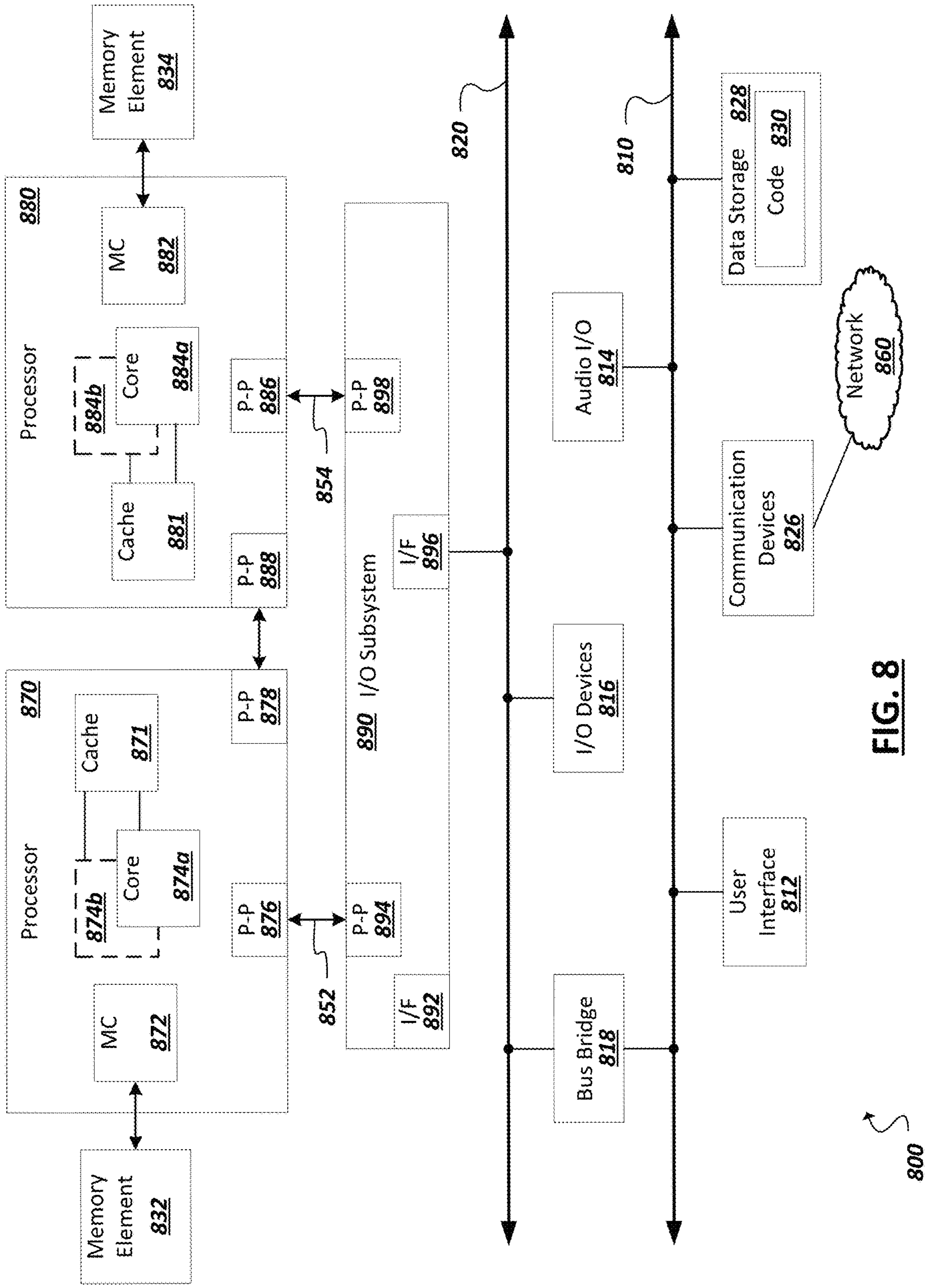
FIG. 8 is a simplified block diagram of an example computing system.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro-operation such as a fixed width micro operation in a predefined format, or may generate other instructions, microinstructions, or control signals that reflect the original code instruction. Front-end logic 706 also includes register renaming logic 710 and scheduling logic 712, which generally allocates resources and queue the operation corresponding to the instruction for execution.

Processor 700 can also include execution logic 714 having a set of execution units 716*a*, 716*b*, 716*n*, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 700.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a co-processor 838, such as a high-performance graphics circuit, machine learning accelerator, or other co-processor 838, via an interface 839, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine readable storage medium with instructions stored thereon, the instruction executable by a machine to cause the machine to: receive an audio signal generated by a microphone of a user computing device; generate an input feature for the audio signal, where the input feature includes, for each of a plurality of frequency components in the audio signal, a respective magnitude value; apply a machine learning model to the input feature, where the machine learning model is to infer frequencies associated with self-noise generated at the microphone based on the magnitude values for the plurality of frequency components; generate, based on the machine learning model, an attenuation mask, where the attenuation mask identifies an attenuation value for each of the plurality of frequency components; apply the attenuation mask to the magnitude values for the plurality of frequency components to attenuate the magnitude values of at least a subset of the plurality of frequency components;

and generate a denoised version of the audio signal including the attenuated magnitude values for the subset of frequency components.

Example 2 includes the subject matter of example 1, where the instructions are further executable to cause the denoised version of the audio signal to be passed from audio firmware of the user computing device to an operating system of the user computing device.

Example 3 includes the subject matter of example 2, where the machine learning model includes a neural network to be executed in the audio firmware.

Example 4 includes the subject matter of example 3, where the neural network includes a module to convert the input feature into a lower-dimensional version of the input feature.

Example 5 includes the subject matter of any one of examples 1-4, where the self-noise includes stationary noise generated by the microphone.

Example 6 includes the subject matter of example 5, where the self-noise further includes stationary noise generated by other hardware of the user computing device.

Example 7 includes the subject matter of any one of examples 1-6, where the generation of the input feature includes separating the audio signal into a magnitude spectrum and an angular spectrum, where the magnitude spectrum includes the respective magnitude values of the plurality of frequency components.

Example 8 includes the subject matter of example 7, where the audio signal is separated into the magnitude spectrum and the angular spectrum through a short-time Fourier Transform (STFT).

Example 9 includes the subject matter of example 8, where generating the denoised version of the audio signal includes rejoining the angular spectrum with a denoised version of the magnitude spectrum through an inverse STFT (ISTFT).

Example 10 includes the subject matter of any one of examples 1-9, where the attenuation mask identifies a respective attenuation value for each one of the plurality of frequency components.

Example 11 includes the subject matter of example 10, where each attenuation value is between 0 and 1 and the attenuation mask is applied through multiplication of respective attenuation values with respective magnitude values of the plurality of frequency components.

Example 12 includes the subject matter of any one of examples 1-11, where the attenuation mask is generated as an output of the machine learning model.

Example 13 includes the subject matter of any one of examples 1-12, where the attenuation mask includes a first attenuation mask generated for a first portion of the audio signal in a first frame, and the instructions are further executable to cause the machine to generate a second attenuation mask for a second portion of the audio signal in a second frame.

Example 14 includes the subject matter of any one of examples 1-13, where the microphone includes a particular one of a plurality of microphones on the user computing device, and the same attenuation mask generated from the feature input associated with the audio signal generated by the particular microphone is applied to respective audio signals generated by the plurality of microphones.

Example 15 is a method including: receiving an audio signal generated by a microphone of a user computing device; generating an input feature for the audio signal, where the input feature includes, for each of a plurality of frequency components in the audio signal, a respective magnitude value; applying a machine learning model to the input feature, where the machine learning model is to infer frequencies contributing to self-noise generated at the microphone based on the magnitude values for the plurality of frequency components; generating, based on the machine learning model, an attenuation mask, where the attenuation mask identifies an attenuation value for each of the plurality of frequency components; applying the attenuation mask to the magnitude values for the plurality of frequency components to attenuate the magnitude values of at least a subset of the plurality of frequency components; and generating a denoised version of the audio signal including the attenuated magnitude values for the subset of frequency components.

Example 16 includes the subject matter of example 15, where the instructions are further executable to cause the denoised version of the audio signal to be passed from audio firmware of the user computing device to an operating system of the user computing device.

Example 17 includes the subject matter of example 16, where the machine learning model includes a neural network to be executed in the audio firmware.

Example 18 includes the subject matter of example 17, where the neural network includes a module to convert the input feature into a lower-dimensional version of the input feature.

Example 19 includes the subject matter of any one of examples 15-18, where the self-noise includes stationary noise generated by the microphone.

Example 20 includes the subject matter of example 19, where the self-noise further includes stationary noise generated by other hardware of the user computing device.

Example 21 includes the subject matter of any one of examples 15-20, where the generation of the input feature includes separating the audio signal into a magnitude spectrum and an angular spectrum, where the magnitude spectrum includes the respective magnitude values of the plurality of frequency components.

Example 22 includes the subject matter of example 21, where the audio signal is separated into the magnitude spectrum and the angular spectrum through a short-time Fourier Transform (STFT).

Example 23 includes the subject matter of example 22, where generating the denoised version of the audio signal includes rejoining the angular spectrum with a denoised version of the magnitude spectrum through an inverse STFT (ISTFT).

Example 24 includes the subject matter of any one of examples 15-23, where the attenuation mask identifies a respective attenuation value for each one of the plurality of frequency components.

Example 25 includes the subject matter of example 24, where each attenuation value is between 0 and 1 and the attenuation mask is applied through multiplication of respective attenuation values with respective magnitude values of the plurality of frequency components.

Example 26 includes the subject matter of any one of examples 15-25, where the attenuation mask is generated as an output of the machine learning model.

Example 27 includes the subject matter of any one of examples 15-26, where the attenuation mask includes a first attenuation mask generated for a first portion of the audio signal in a first frame, and the instructions are further executable to cause the machine to generate a second attenuation mask for a second portion of the audio signal in a second frame.

Example 28 includes the subject matter of any one of examples 15-27, where the microphone includes a particular one of a plurality of microphones on the user computing device, and the same attenuation mask generated from the feature input associated with the audio signal generated by the particular microphone is applied to respective audio signals generated by the plurality of microphones.

Example 29 is a system including means to perform the method of any one of examples 15-28.

Example 30 is an apparatus including: a microphone to generate an audio signal at a user computing device; a self-noise silencer to: generate an input feature for the audio signal, where the input feature includes, for each of a plurality of frequency components in the audio signal, a respective magnitude value; apply a machine learning model to the input feature, where the machine learning model is trained to infer frequencies attributable to self-noise generated at the microphone from the input feature; generate, based on the machine learning model, an attenuation mask, where the attenuation mask identifies an attenuation value for at least a subset of the plurality of frequency components; and apply the attenuation mask to at least the subset of the plurality of frequency components to remove self-noise from the audio signal to generate a denoised version of the audio signal.

Example 31 includes the subject matter of example 30, where the self-noise silencer is implemented in firmware of the user computing device.

Example 32 includes the subject matter of example 31, where the machine learning model includes a neural network to be executed in the firmware.

Example 33 includes the subject matter of example 32, where the neural network includes a module to convert the input feature into a lower-dimensional version of the input feature.

Example 34 includes the subject matter of example 33, where the self-noise includes stationary noise generated by the microphone.

Example 35 includes the subject matter of example 34, where the self-noise further includes stationary noise generated by other hardware of the user computing device.

Example 36 includes the subject matter of any one of examples 30-35, where the generation of the input feature includes separating the audio signal into a magnitude spectrum and an angular spectrum, where the magnitude spectrum includes the respective magnitude values of the plurality of frequency components.

Example 37 includes the subject matter of example 36, where the audio signal is separated into the magnitude spectrum and the angular spectrum through a short-time Fourier Transform (STFT).

Example 38 includes the subject matter of example 37, where generating the denoised version of the audio signal includes rejoining the angular spectrum with a denoised version of the magnitude spectrum through an inverse STFT (ISTFT).

Example 39 includes the subject matter of any one of examples 30-38, where the attenuation mask identifies a respective attenuation value for each one of the plurality of frequency components.

Example 40 includes the subject matter of example 39, where each attenuation value is between 0 and 1 and the attenuation mask is applied through multiplication of respective attenuation values with respective magnitude values of the plurality of frequency components.

Example 41 includes the subject matter of any one of examples 30-40, where the attenuation mask is generated as an output of the machine learning model.

Example 42 includes the subject matter of any one of examples 30-41, where the attenuation mask includes a first attenuation mask generated for a first portion of the audio signal in a first frame, and a second attenuation mask is to be generated by the self-noise silencer for a second portion of the audio signal in a second frame.

Example 43 includes the subject matter of any one of examples 30-42, where the microphone includes a particular one of a plurality of microphones on the user computing device, and the same attenuation mask generated from the feature input associated with the audio signal generated by the particular microphone is applied to respective audio signals generated by the plurality of microphones.

Example 44 is a system including: a user computing device including: a processor; microphone to capture an audio signal; and firmware including a self-noise silencer executable by the processor to: generate a feature set from the audio signal, where the feature set includes, for each of a plurality of frequency components in the audio signal, a respective magnitude value; provide the feature set as an input to a machine learning model trained to infer frequencies in the audio signal attributable to self-noise generated at the microphone; generate, based on the machine learning model, an attenuation mask, where the attenuation mask identifies an attenuation value for each of the plurality of frequency components; and apply the attenuation mask to the magnitude values of the plurality of frequency components to remove self-noise from the audio signal.

Example 45 includes the subject matter of example 44, where the user computing device includes a plurality of microphones to generate a plurality of audio signals within a frame, the features set is generated from a single one of the plurality of microphones, the attenuation mask generated for the frame, and the attenuation mask is to be applied to each of the plurality of audio signals to remove self-noise from the plurality of audio signals in the frame.

Example 46 includes the subject matter of example 44, where the user computing device includes one of a laptop or desktop computer.

Example 47 includes the subject matter of example 44, where the user computing device includes one of a smart phone, tablet computer, or gaming system.

Example 48 includes the subject matter of any one of examples 44-47, where the machine learning model is trained from a training set including clean audio samples and stationary noise samples.

Example 49 includes the subject matter of any one of examples 44-48, where removing the self-noise from the audio signal results in generation of a denoised version of the audio signal, and the system further including an operating system to support a set of applications, and the firmware is to send the denoised version of the audio signal to the operating system for use by one or more of the set of applications.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine readable storage medium with instructions stored thereon, the instruction executable by a machine to cause the machine to:

receive an audio signal generated by a microphone of a user computing device;

generate an input feature for the audio signal, wherein the input feature comprises, for each of a plurality of frequency components in the audio signal, a respective magnitude value;

apply a machine learning model to the input feature, wherein the machine learning model is to infer frequencies associated with self-noise generated at the microphone based on the magnitude values for the plurality of frequency components;

generate, based on the machine learning model, an attenuation mask, wherein the attenuation mask identifies an attenuation value for each of the plurality of frequency components;

apply the attenuation mask to the magnitude values for the plurality of frequency components to attenuate the magnitude values of at least a subset of the plurality of frequency components; and generate a denoised version of the audio signal comprising the attenuated magnitude values for the subset of frequency components.

2. The storage medium of claim 1, wherein the instructions are further executable to cause the denoised version of the audio signal to be passed from audio firmware of the user computing device to an operating system of the user computing device.

3. The storage medium of claim 2, wherein the machine learning model comprises a neural network to be executed in the audio firmware.

4. The storage medium of claim 3, wherein the neural network comprises a module to convert the input feature into a lower-dimensional version of the input feature.

5. The storage medium of claim 1, wherein the self-noise comprises stationary noise generated by the microphone.

6. The storage medium of claim 5, wherein the self-noise further comprises stationary noise generated by other hardware of the user computing device.

7. The storage medium of claim 1, wherein the generation of the input feature comprises separating the audio signal into a magnitude spectrum and an angular spectrum, wherein the magnitude spectrum comprises the respective magnitude values of the plurality of frequency components.

8. The storage medium of claim 7, wherein the audio signal is separated into the magnitude spectrum and the angular spectrum through a short-time Fourier Transform (STFT).

9. The storage medium of claim 8, wherein generating the denoised version of the audio signal comprises rejoining the angular spectrum with a denoised version of the magnitude spectrum through an inverse STFT (iSTFT).

10. The storage medium of claim 1, wherein the attenuation mask identifies a respective attenuation value for each one of the plurality of frequency components.

11. The storage medium of claim 10, wherein each attenuation value is between 0 and 1 and the attenuation mask is applied through multiplication of respective attenuation values with respective magnitude values of the plurality of frequency components.

12. The storage medium of claim 1, wherein the attenuation mask is generated as an output of the machine learning model.

13. The storage medium of claim 1, wherein the attenuation mask comprises a first attenuation mask generated for a first portion of the audio signal in a first frame, and the instructions are further executable to cause the machine to generate a second attenuation mask for a second portion of the audio signal in a second frame.

14. The storage medium of claim 1, wherein the microphone comprises a particular one of a plurality of microphones on the user computing device, and the same attenuation mask generated from the feature input associated with the audio signal generated by the particular microphone is applied to respective audio signals generated by the plurality of microphones.

15. An apparatus comprising:

a microphone to generate an audio signal at a user computing device;

a self-noise silencer to:

generate an input feature for the audio signal, wherein the input feature comprises, for each of a plurality of frequency components in the audio signal, a respective magnitude value;

apply a machine learning model to the input feature, wherein the machine learning model is trained to infer frequencies attributable to self-noise generated at the microphone from the input feature;

generate, based on the machine learning model, an attenuation mask, wherein the attenuation mask identifies an attenuation value for at least a subset of the plurality of frequency components; and apply the attenuation mask to at least the subset of the plurality of frequency components to remove self-noise from the audio signal to generate a denoised version of the audio signal.

16. A system comprising:

a user computing device comprising:

a processor;

a microphone to capture an audio signal; and firmware comprising a self-noise silencer executable by the processor to:

generate a feature set from the audio signal, wherein the feature set comprises, for each of a plurality of frequency components in the audio signal, a respective magnitude value;

provide the feature set as an input to a machine learning model trained to infer frequencies in the audio signal attributable to self-noise generated at the microphone;

generate, based on the machine learning model, an attenuation mask, wherein the attenuation mask identifies an attenuation value for each of the plurality of frequency components; and apply the attenuation mask to the magnitude values of the plurality of frequency components to remove self-noise from the audio signal.

17. The system of claim 16, wherein the user computing device comprises a plurality of microphones to generate a plurality of audio signals within a frame, the features set is generated from a single one of the plurality of microphones, the attenuation mask generated for the frame, and the attenuation mask is to be applied to each of the plurality of audio signals to remove self-noise from the plurality of audio signals in the frame.

18. The system of claim 16, wherein the user computing device comprises one of a laptop or desktop computer.

19. The system of claim 16, wherein the user computing device comprises one of a smart phone, tablet computer, or gaming system.

20. The system of claim 16, wherein the machine learning model is trained from a training set comprising clean audio samples and stationary noise samples.

* * * * *